US011818361B2

(12) United States Patent
Takagi et al.

(10) Patent No.: US 11,818,361 B2
(45) Date of Patent: Nov. 14, 2023

(54) DATA COMPRESSION APPARATUS, DATA COMPRESSION METHOD, AND PROGRAM

(71) Applicant: NIPPON TELEGRAPH AND TELEPHONE CORPORATION, Tokyo (JP)

(72) Inventors: Masaru Takagi, Musashino (JP); Kazuya Matsuo, Musashino (JP); Lidwina Ayu Andarini, Musashino (JP); Jun Shioda, Musashino (JP); Ryota Nakada, Musashino (JP); Koya Mori, Musashino (JP); Tomohiro Inoue, Musashino (JP); Masahiro Yoshida, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 234 days.

(21) Appl. No.: 17/438,224

(22) PCT Filed: Dec. 17, 2019

(86) PCT No.: PCT/JP2019/049407
§ 371 (c)(1),
(2) Date: Sep. 10, 2021

(87) PCT Pub. No.: WO2020/183839
PCT Pub. Date: Sep. 17, 2020

(65) Prior Publication Data

US 2022/0191511 A1 Jun. 16, 2022

(30) Foreign Application Priority Data

Mar. 14, 2019 (JP) ................................ 2019-046833

(51) Int. Cl.
*H04N 19/159* (2014.01)
*H04N 19/186* (2014.01)

(52) U.S. Cl.
CPC ......... *H04N 19/159* (2014.11); *H04N 19/186* (2014.11)

(58) Field of Classification Search
CPC ........................... H04N 19/159; H04N 19/186
(Continued)

(56) References Cited

U.S. PATENT DOCUMENTS 8,553,997 B1 * 10/2013 Hernandez Esteban .................... G06T 9/001 382/233
2007/0237404 A1 * 10/2007 Strom ................. H04N 19/176 382/232

(Continued)

FOREIGN PATENT DOCUMENTS

JP 2009053059 A 3/2009
JP 2011113364 A 6/2011

(Continued)

OTHER PUBLICATIONS

Velodyne LiDAR, Inc., "Puck Real-Time 3D LiDAR Sensor," [online], [searched on Jan. 23, 2019], Apr. 18, Internet (URL: https://velodynelidar.com/vlp-16.html).

(Continued)

*Primary Examiner* — Matthew David Kim
(74) *Attorney, Agent, or Firm* — Harness, Dickey & Pierce, P.L.C.

(57) ABSTRACT

The object of the present invention is to provide a technique capable of effectively compressing point cloud data output from the ranging sensor. A data compression apparatus of the present invention includes a data acquisition unit (121) which acquires point cloud data including a plurality of sets (Continued)

each including a direction and a distance from a ranging sensor (11), a data conversion unit (122) which converts directions and distances in the sets into color signals, an image generation unit (123) which generates a bitmap Image by mapping the color signals into a two-dimensional data structure in accordance with the directions, and an image compression unit (124) which applies a predetermined image compression technique to the bitmap image.

9 Claims, 5 Drawing Sheets

(58) Field of Classification Search
USPC ..................................................... 375/240.12
See application file for complete search history.

(56) References Cited

U.S. PATENT DOCUMENTS

2009/0154802 A1* 6/2009 Tang .................... H04N 19/132 382/166
2009/0245629 A1* 10/2009 Hayami ................. H04N 1/648 382/167
2011/0205338 A1* 8/2011 Choi ......................... G06T 7/74 348/46
2014/0172296 A1* 6/2014 Shtukater ........... G01C 21/3647 701/408
2015/0172669 A1* 6/2015 Nishiyama ........... H04N 19/136 375/240.08
2017/0032220 A1* 2/2017 Medasani ............... G06F 18/23
2018/0192059 A1* 7/2018 Yang ..................... G01S 17/931
2019/0311526 A1* 10/2019 Sugio ................... H04N 13/194
2019/0362530 A1* 11/2019 Shimakawa .............. G06T 7/70
2020/0209394 A1* 7/2020 Mark ...................... G01S 17/42

FOREIGN PATENT DOCUMENTS

JP 2013161133 A * 8/2013
WO WO-2018123801 A1 7/2018

OTHER PUBLICATIONS

Shea Hagstrom et al., "Estimating sampling completeness of Lidar datasets using voxel-based geometry," Proc. of SPIE vol. 9080, Jun. 2014.
International Search Report issued in PCT/JP2019/049407, dated Mar. 17, 2020.

* cited by examiner

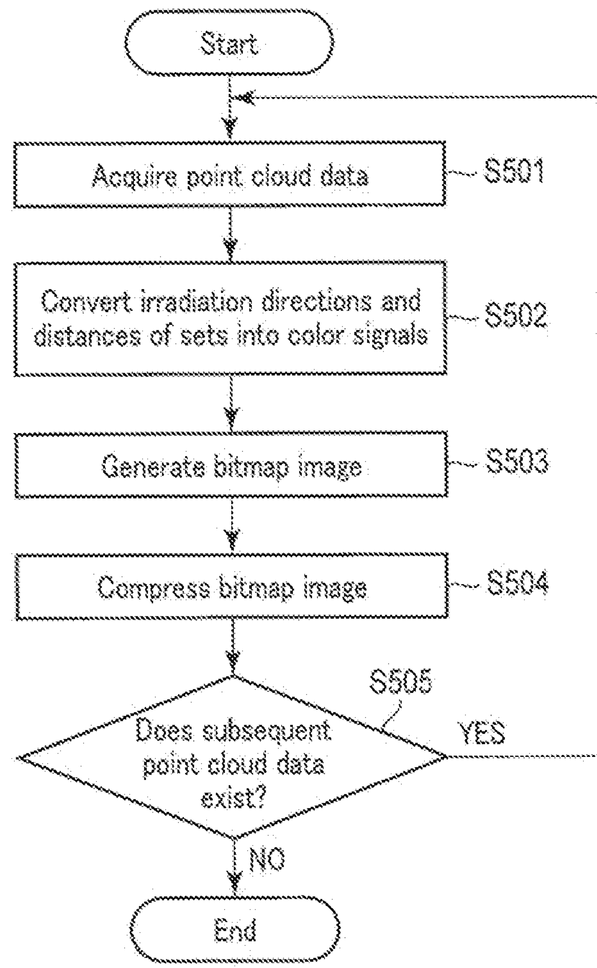
F I G. 5

| Data form | File size | Size ratio | Average error |
|---|---|---|---|
| Raw data (binary) | 102KB | (Standard) | (Standard) |
| Prior art (1) (zip compression) | 69KB | 68% | 0.0cm |
| Prior art (2) (enumeration of coordinates) | 545KB | 534% | 0.0cm |
| Prior art (2) + (1) (enumeration + zip compression) | 191KB | 187% | 0.0cm |
| Prior art (3) (1 cm meshes) | 102,567,624KB | 100,556,494% | 0.5cm |
| Prior art (3) (10 cm meshes) | 102,706KB | 102,692% | 4.8cm |
| Prior art (3) (100 cm meshes) | 107KB | 105% | 48.0cm |
| Technique according to present embodiment | 49KB | 48% | 4.7cm |

FIG. 6

| Quality parameter of JPEG | File size | Size ratio | Average error |
|---|---|---|---|
| Quality = 100 (highest quality) | 86KB | 84% | 0.5cm |
| Quality = 97 | 67KB | 66% | 1.5cm |
| Quality = 95 | 59KB | 58% | 2.4cm |
| Quality = 90 (balance) | 49KB | 48% | 4.7cm |
| Quality = 85 | 29KB | 28% | 25.4cm |
| Quality = 50 | 20KB | 20% | 29.4cm |
| Quality = 10 | 14KB | 14% | 34.9cm |
| Quality = 1 (maximum compression) | 13KB | 13% | 40.4cm |

FIG. 7

DATA COMPRESSION APPARATUS, DATA COMPRESSION METHOD, AND PROGRAM

CROSS-REFERENCE TO RELATED APPLICATIONS

This application is a 371 U.S. National Phase of International Application No. PCT/JP2019/049407 filed on Dec. 17, 2019, which claims priority to Japanese Application No. 2019-046833 filed on Mar. 14, 2019. The entire disclosures of the above applications are incorporated herein by reference.

FIELD

Aspects of the present invention relate to a technique of compressing point cloud date output from a ranging sensor.

BACKGROUND

In autonomous driving of Automobiles or robots, a technique of accurately measuring the ambient three-dimensional space is indispensable, and various sensor devices are used according to the use. In particular, LiDAR (Light Detection and Ranging) having a wide viewing angle covering the omniazimuth and capable of accurately measuring distances to individual objects is highly effective. LiDAR is a type of remote sensing techniques using light, and radially applies pulsed laser beams to estimate a distance to the object based on time spent until the reflected light reaches. Although the principle of LiDAR is similar to radar, the resolution thereof is improved by using light of a wavelength shorter than that of radio waves of the radar. This enables measurement of a relative distance with respect to an object existing within a range of a radius of scores of meters with an error of approximately several centimeters (for example, see Non-patent Literature 1).

In current LiDAR devices, ranging of hundreds of thousands of points to several million points is possible for a second, and the number of points that can be ranged is expected to increase in the future. With the increase, the data volume output from the LiDAR device is considered to increase from the current volume, that is, several megabytes per second.

CITATION LIST

Non-Patent Literatures

NON-PATENT LITERATURE 1: Velodyne LiDAR, Inc., "Puck REAL-TIME 3D LiDAR SENSOR." [online], [searched on Jan. 23, 2019], April 16, Internet (URL: https://velodynelidar.ccm/vlp-16.html).

NON-PATENT LITERATURE 2: Shea Hagstrom et al., "Estimating sampling completeness of Lidar datasets using voxel-based geometry," Proc. of SPIE Vol. 9080, June 2014.

SUMMARY

Technical Problem

Point cloud data output from the LiDAR device is generally raw data in binary format in which sets each including the emission direction of the laser beam and the distance to the reflection point are enumerated. However, dealing with the point cloud data is complicated when no processing is performed for it, and point cloud data is usually used after converted into the three-dimensional orthogonal coordinate system whose origin is set at the position of the LiDAR device in many cases. In prior art, a data format in which three-dimensional coordinate values obtained by conversion are enumerated in a plain text is widely used, but the data format has the problem of increase in file size in comparison with raw data in binary format. In addition, because the data format in which three-dimensional coordinate values are enumerated in a plain text is not a data format directly expressing the three-dimensional space, it is difficult to use time-spatial continuity of the point cloud data, such as positional relation between adjacent points, for data compression.

To deal with the problem, a data format directly expressing the three-dimensional space has been proposed. In this data format, the space is divided into three-dimensional meshes with the LiDAR device serving as the center, and presence/absence of point in each mesh is counted for all the meshes to directly express the three-dimensional space (for example, see Non-patent Literature 2). However, to cover a broad region including all the points, it is required to prepare an enormous number of meshes, and the file size is easily increased markedly. The data format has the feature that the file size is fixed regardless of the number of points when the region is determined. However, when the mesh granularity becomes finer, there is the problem that the file else increases explosively in proportion to the cube of the granularity.

By contrast, point cloud data output from the LiDAR device mounted on an automobile is very useful to prepare a three-dimensional map faithfully reproducing the real world, and is desirably collected in real time. To transmit point cloud data from an automobile being a moving object, it is required to use a mobile phone network. Because the data volume to be transmitted is directly linked to the communication fee, it is desirable to reduce the file size as much as possible. In addition, also from the viewpoint of reduction in load of the communication network, data compression is an important technical problem.

The present invention has been made in consideration of the circumstances described above, and an object of the present invention is to provide a technique capable of effectively compressing point cloud data output from the ranging sensor.

Solution to Problem

In one aspect of the present invention, a data compression apparatus includes a data acquisition unit configured to acquire point cloud data including sets each including a direction and a distance from a ranging sensor, an image generation unit configured to generate a bitmap image based on directions and distances in the sets, and an image compression unit configured to apply a predetermined image compression technique to the bitmap image.

Advantageous Effects of Invention

According to one aspect of the present invention, there is provided a technique capable of effectively compressing point cloud data output from the ranging sensor.

BRIEF DESCRIPTION OF THE DRAWINGS

FIG. 5 is a flowchart illustrating an operation example of the data compression apparatus illustrated in FIG. 1.

FIG. 6 is a diagram illustrating compression results of point cloud data with the data compression apparatus illustrated in FIG. 1 and prior art.

FIG. 7 is a diagram illustrating compression results of point cloud data corresponding to compression rate parameters with the data compression apparatus illustrated in FIG. 1.

DETAILED DESCRIPTION

Embodiments of the present invention will be described hereinafter with reference to the drawings.

Embodiment

[Configuration]

Figure 1:
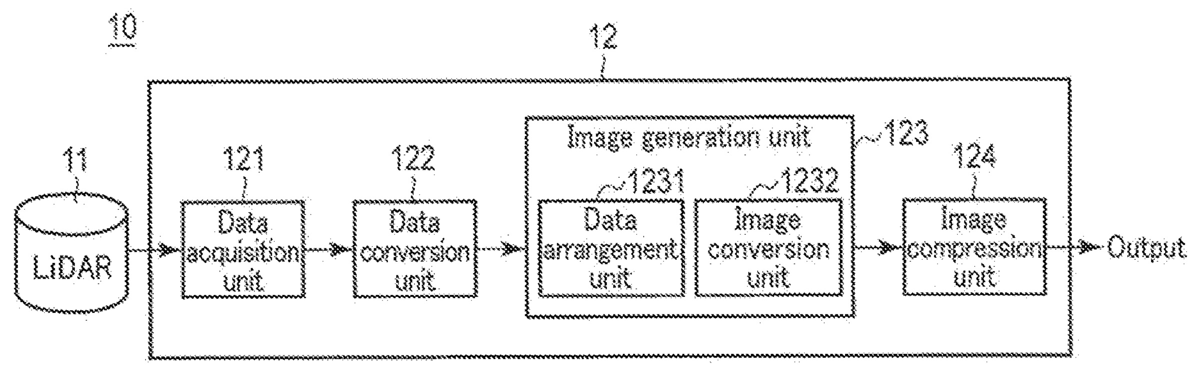
FIG. 1 is a block diagram illustrating a ranging apparatus according to an embodiment of the present invention.

FIG. 1 schematically illustrates a ranging apparatus 10 according to one embodiment of the present invention. As illustrated in FIG. 1, the ranging apparatus 10 includes a LiDAR device 11 and a data compression apparatus 12. The ranging apparatus 10 is applied to, for example, an automobile or a robot. In an example where the ranging apparatus 10 is mounted on an automobile, the LiDAR device 11 is disposed on, for example, the roof of the automobile, and the data compression apparatus 12 performs compression processing for point cloud data output from the LiDAR device 11 and outputs the point cloud data to an ECU (Electronic Control Unit) of the automobile.

The LiDAR device 11 scans the ambient three-dimensional space using laser beams, and thereby generates point cloud data including a plurality of sets each including the emission direction of the beam and a distance to the object existing in the emission direction. The emission direction and the distance in each of the sets indicate the point (position) at which the laser beam is reflected. The point cloud data enables recognition of the ambient circumstances.

The LiDAR device 11 includes a light source which emits pulsed laser beams and a detector which detects reflected light thereof. The LiDAR device 11 further includes a mirror supported by a stationary past and rotatable biaxially to scan laser beams in a two-dimensional manner. The mirror is rotated on a rotation axis such that the LiDAR device 11 has a 360-degree field of view, and rotated on an axis perpendicular to the rotation axis such that the LiDAR device 11 has a field at vies of a predetermined angle (for example, 30°).

In point cloud data output from the LiDAR device 11, each of the points is expressed with a polar coordinate system. The emission direction of the laser beam is expressed with two angle coordinates, for example, a rotation angle (also referred to as "azimuthal angle") and an elevation/depression angle. The rotation angle indicates the angle around the rotation axis, and the elevation/depression angle indicates the angle with respect to a plane perpendicular to the rotation axis. The rotation angle and the elevation/depression angle correspond to the direction of the mirror when the laser beam is emitted. The distance is calculated from a difference in time between the time when the laser light is emitted and the time when the reflected light of the laser light returns.

The LiDAR device 11 outputs point cloud data to the data compression apparatus 12. The LiDAR device 11 continuously performs scan, that is, performs scan while rotating on the rotation axis over a plurality of rounds.

The structure of the LiDAR device 11 is not limited to the example described above. For example, the LiDAR device 11 may include a plurality of light sources. When the LiDAR device 11 includes a number of light sources, the LiDAR device 11 is not necessarily of a rotation type. The LiDAR device 11 described above is a non-limiting example of the ranging sensor configured to scan the ambient three-dimensional space to generate point cloud data including a plurality of sets each including a direction and a distance.

The data compression apparatus 12 includes a data acquisition unit 121, a data conversion unit 122, an image generation unit 123, and an image compression unit 124. The data compression apparatus 12 is implemented by a computer system including a hardware processor. The computer system nay be a controller which controls the LiDAR device 11.

The data acquisition unit 121 acquires point cloud data from the LiDAR device 11. The point cloud data output from the LiDAR device 11 is raw data in binary format including a plurality of sets each including the emission direction of the laser beam and a distance. The data compression apparatus 12 performs processing for point cloud data for one round, that is, point cloud data obtained by the LiDAR device 11 while the LiDAR device 11 makes one rotation on the rotation axis, as unit data. The data compression apparatus 12 repeats an operation of processing point cloud data of one round. For example, the data compression apparatus 12 processes point cloud data for one round, processes point cloud data of the next round, and thereafter processes point cloud data of the subsequent round. In the following explanation, the term "point cloud data" basically indicates point cloud data of one round.

Figure 2:
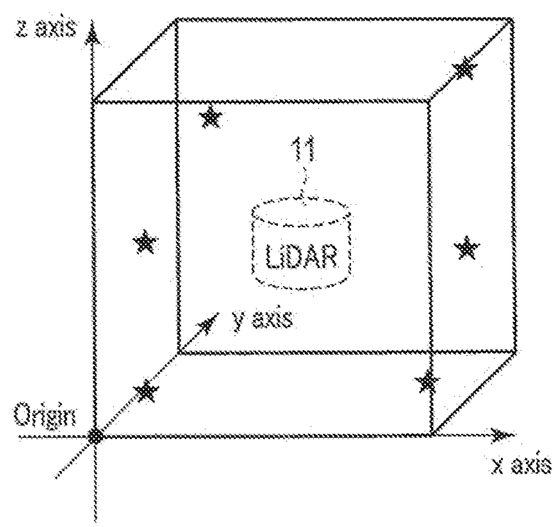
FIG. 2 is a diagram illustrating processing details of a data conversion unit illustrated in FIG. 1.

The data conversion unit 122 converts the emission directions and the distances in the seta included in the point cloud data into color signals. In the present embodiment, the data conversion unit 122 converts the emission directions and the distances in the sets into color signals by converting the emission direction and the distance in each of the sets into a three-dimensional coordinate value and regarding the three-dimensional coordinate value as an RGB value including three numerical values expressing a color (intensities of red, green, and blue that is the three primary colors of light). The three-dimensional coordinate value includes three coordinate values of the three-dimensional orthogonal coordinate system, for example, an x coordinate value, a y coordinate value, and a z coordinate value. Specifically, the data conversion unit 122 performs transformation from the polar coordinate system to the three-dimensional orthogonal coordinate system. The data conversion unit 122 determines the origin of the three-dimensional orthogonal coordinate system such that all the coordinate values have a value greater than or equal to 0. This is because the image generation unit 123 of the following stage is not capable of dealing with a negative value. The processing details herein corresponds to preparing a rectangular parallelepiped including all the points corresponding to the point cloud data as illustrated in FIG. 2, setting any one of vertexes of the rectangular parallelepiped as the origin, and setting directions of three sides extending from the vertex as the x axis, the y axis, and the z axis.

With reference to FIG. 1 again, the image generation unit 123 generates a bitmap image based on the emission directions and the distances in the sets included in the point cloud data. In the present embodiment, the image generation unit 123 generates a bitmap image by mapping the color signals obtained by the data conversion unit 122 into a two-dimensional data structure in accordance with the emission directions included in the point cloud data. Specifically, the image generation unit 123 includes a data arrangement unit 1231 and an image conversion unit 1232.

In the present embodiment, attention is paid to the configuration in which the LiDAR device 11 scans the laser beans in a two-dimensional manner to perform ranging. The data arrangement unit 1231 maps, that is, arranges three-dimensional coordinate values into a two-dimensional data structure in accordance with the emission directions, that is, the value of the elevation/depression angle and the value of the rotation angle.

Figure 3:
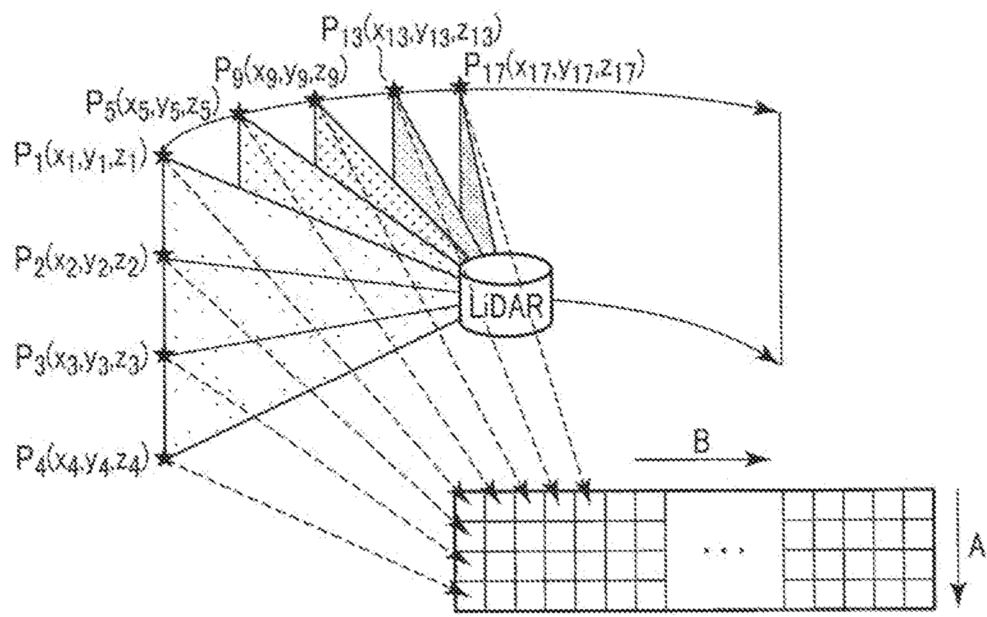
FIG. 3 is a diagram illustrating processing details of a data arrangement unit illustrated in FIG. 1.

The LiDAR device 11 performs an operation of measuring the distance while changing the elevation/depression angle in units of a predetermined angle, and performs the sane operation with the rotation angle changed by the predetermined angle. The LiDAR device 11 generates point cloud data by repeating the operation. Specifically, as illustrated in FIG. 3, the LiDAR device 11 successively obtains data relating to points $P_1$ to $P_4$ by performing the operation described above. Thereafter, the LiDAR device 11 performs the operation described above with the rotation angle changed by the predetermined angle to successively obtain data relating to points $P_5$ to $P_8$ (points $P_6$ to $P_8$ are not illustrated in FIG. 3). In addition, the LiDAR device 11 performs the operation described above with the rotation angle changed by the predetermined angle to successively obtain data relating to points $P_9$ to $P_{12}$ (points $P_{10}$ to $P_{12}$ are not illustrated in FIG. 3). In FIG. 3, values ($x_i$, $y_i$, $z_i$) described on the side of the point $P_i$ indicate a three-dimensional coordinate value corresponding to the point $P_i$ obtained by the data conversion unit 122. The direction A indicates the elevation/depression angle direction, and the direction B indicates the rotation angle direction.

In this example, for explanation, distance measurement is performed four times with respect to the elevation/depression direction, the predetermined angle relating to the rotation angle direction is set to 15°, and the two-dimensional data structure is expressed as "$a_{i,j}$" (i=0, 1, . . . , 23, j=0, 1, . . . , 3). The points $P_1$ to $P_4$ arranged in the elevation/depression angle direction are mapped to $a_{0,1}$, $a_{0,1}$, $a_{0,2}$, and $a_{0,3}$, respectively. The points $P_1$, $P_5$, $P_9$, $P_{13}$, and $P_{17}$ arranged in the rotation angle direction are snapped to $a_{0.0}$, $a_{1.0}$, $a_{2.0}$, $a_{3.0}$, and $a_{4.0}$, respectively. As described above, the point cloud data for one round is mapped into a two-dimensional data structure in a panoramic photograph manner. In this manner, the spatial positional relation between adjacent points (elements) becomes close, and the color signals continuously change as a whole. This enables use of the spatial continuity of the point cloud data for data compression.

With reference to FIG. 1 again, the image conversion unit 1232 embeds color signals corresponding to respective points output from the data conversion unit 122 in an image file in bitmap format, in accordance with the processing results of the data arrangement unit 1231. With reference to the example explained with reference to FIG. 3 again, a bitmap image of 24×4 pixels corresponding to the two-dimensional data structure is prepared. When the upper left pixel in the bitmap image is set as the origin, the color signal corresponding to the point $P_1$ is written to the pixel of the coordinates (0, 0). In other words, the coordinate value $x_1$, $y_1$, and $z_1$ corresponding to the point $P_1$ are dealt with as the R value, the G value, and the B value of the pixel of the coordinates (0, 0). In the same manner, the color signal corresponding to the point $P_2$ is written to the pixel of the coordinates (0, 1), and the color signal corresponding to the point $P_5$ written to the pixel of the coordinates (1, 0). In this manner, the point cloud data is embedded in the image file of the bitmap form. By converting the point cloud data being raw data in binary format Into data of a bitmap image, it is possible to apply an existing image compression technique, such as JPEG and PNG.

The image compression unit 124 applies a predetermined image compression technique to the bitmap image. An existing image compression technique, such as JPEG and PNG, may be used as the predetermined image compression technique. For example, when JPEG is used, the image compression unit 124 outputs a file in JPEG format as point cloud data. In the point cloud data output from the data compression apparatus 12, each of the points is expressed with three-dimensional orthogonal coordinate system.

Figure 4:
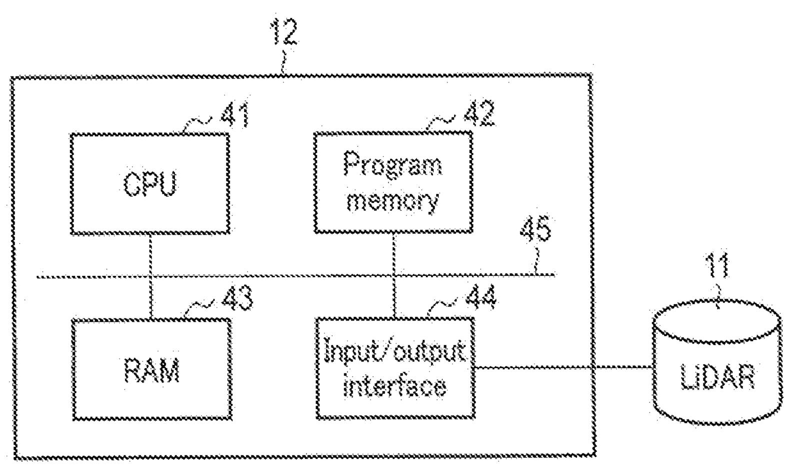
FIG. 4 is a block diagram illustrating a hardware configuration of a data compression apparatus illustrated in FIG. 1.

FIG. 4 schematically illustrates an example of a hardware configuration of the data compression apparatus 12. As illustrated in FIG. 4, the data compression apparatus 12 includes, as hardware, a CPU (Central Processing Unit) 41, a program memory 42, a RAM (Random Access Memory) 43, and an input/output interface 44, which are connected with a bus 45. The CPU 41 communicates with the program memory 42 the RAM 43, and the input/output interface 44 through the bus 45.

The CPU 41 is an example of a general, processor. The program memory 42 stores therein programs, such as a data compression program. For example, a ROM (Read-Only Memory) or a flash memory may be used as the program memory 42. The RAM 43 is used as a working memory with the CPU 41. For example, a SRAM (Static RAM) or a DRAM (Dynamic RAM) say be used as the RAM 43.

The functions of the data compression apparatus 12, for example, the data acquisition unit 121, the data conversion unit 122, the image generation unit 123, and the image compression unit 124 are achieved by expanding the data compression program on the RAM 43 with the CPU 41 and executing the program. Specifically, the CPU 41 functions as the data acquisition unit 121, the data conversion unit 122, the image generation unit 123, and the image compression unit 124, in accordance with the data compression program.

Part or all of the functions of the data compression apparatus 12 may be achieved with a dedicated processor, such as an ASIC (Application Specific Integrated Circuit) or a FPGA (Field Programmable Gate Array). The hardware processor includes a general processor, a dedicated processor, and a combination of a general processor and a dedicated processor. The hardware processor is configured to perform processing performed to be with the data acquisition unit 121, the data conversion unit 122, the image generation unit 123, and the image compression unit 124.

The input/output interface 44 is an interface to communicate with external devices. The CPU 41 receives point cloud data from the LiDAR 11 via the input/output interface 44. The CPU 41 transmits the compressed point cloud data to the output destination (for example, an ECU of the automobile) via the input/output interface 44.

[Operations]

The following is an explanation of an operation example of the data compression apparatus 12.

FIG. 5 schematically illustrates an example of a processing procedure of the data compression apparatus 12. At Step S501 of FIG. 5, the data acquisition unit 121 acquires point cloud data including a plurality of sets each Including the emission direction and the distance from the LiDAR 11. In this example, the point cloud data is point cloud data for one round.

At Step S502, the data conversion unit 122 converts the emission directions and the distances in the sets included in the point cloud data acquired by the data acquisition unit 121 into color signals. For example, the data conversion unit 122 respectively converts the emission directions and the distances in the sets into three-dimensional coordinate values, and uses the three-dimensional coordinate values as color signals. In this example, in the case of performing intermediate processing to convert the directions and the distances in the sets into three-dimensional coordinate values, each of the three-dimensional coordinate values is a set of coordinate values of the three-dimensional orthogonal coordinate system. All the coordinate values may be a value greater than or equal to 0.

At Step S503, the image generation unit 123 generates a bitmap image by mapping the color signals into a two-dimensional data structure in accordance with the emission directions included in the point cloud data acquired by the data acquisition unit 121. For example, the emission direction is expressed with the rotation angle and the elevation/depression angle, and the image generation unit 123 generates a bitmap image by mapping the color signals into a two-dimensional data structure in accordance with the value of the rotation angle and the value of the elevation/depression angle.

At Step S504, the image compression unit 124 applies a predetermined image compression technique to the bitmap image. For example, JPEG nay be used as the image compression technique.

When the subsequent point cloud data exists (Yes at Step S505), the processing from Step S501 to Step S504 is performed for the point cloud data. When no subsequent point cloud data exists (No at Step S506), the processing is ended.

[Advantageous Effects]

The data compression apparatus 12 according to the present embodiment converts sets each including the emission direction and the distance into color signals, generates a bitmap image by mapping the color signals into a two-dimensional data structure in accordance with the emission direction, and applies an image compression technique to the bitmap image. In this manner, the structural features of the three-dimensional space Included in the point cloud data implicitly is reflected on the bitmap image, and it is possible to use spatial continuity of the point cloud data for data compression. This configuration enables effective reduction of the file size of the point cloud data in which each of the points is expressed with the three-dimensional orthogonal coordinate system, by applying an image compression technique for still images, such as JPEG.

In the data conversion unit 122, in the case of performing intermediate processing to convert sets each including the emission direction and the distance into a three-dimensional coordinate value, they are converted into the three-dimensional orthogonal coordinate system such that all the coordinate values is greater than or equal to 0. This configuration enables dealing with the three-dimensional coordinate values obtained by conversion as color signals without any processing, and simplifies the processing of generating a bitmap image. In addition, compressing the point cloud data in units of point cloud data for one round enables effective compression of point cloud data output from the LiDAR device 11 of a rotation type.

Advantages of the technique according to the present embodiment will now be described with reference to FIG. 6 and FIG. 7.

FIG. 6 illustrates file sizes and average errors of coordinate values when point cloud data for one round (0.1 second) acquired with the setting of 600 rpm using VLP-16 being a LiDAR device manufactured by Velodyne Lidar Inc. in various data formats. The ranging upper limit of VLP-16 is 131.7 meters. VLP-16 in capable of acquiring point cloud data for an angle of view of 360° in units of approximately 0.2° in the azimuthal angle direction, and 30° in units of 2° in the elevation/depression angle direction. Accordingly, the point cloud data includes data for 28800 points, and these points are contained in a rectangular parallelepiped having a size of 133 meters in the x axis direction, 234 meters in the y axis direction, and 27 meters in the z axis (perpendicular) direction. In this example, the average error of the coordinate values is an average value of Euclidean distances between the x, y, and z coordinate values of the points expressed in the various data forms and the true x, y, and z coordinate values described in the raw data.

Prior art (1) is a technique of compressing the point cloud data in which the point cloud is expressed with sets each including the emission direction of the laser light and the distance in ZIP format. In the prior art (1), although the three-dimensional coordinate values do not deteriorate, the reduction rate of the file size is limited to 32%. Prior art (2) is a technique of performing conversion from the polar coordinate system into the three-dimensional orthogonal coordinate system to generate point cloud data in which three-dimensional coordinate values obtained by conversion are enumerated in a plain text. The prior art (2)+(1) is a technique of compressing the point cloud data generated by the prior art (2) in ZIP format. In the prior art (2) and prior art (2)+(1), although the three-dimensional coordinate values do not deteriorate, the file size increases.

As in the prior art (2) and prior art (2)+(1), in the case of applying binary data to general data compression processing, such as ZIP and LZH, it is impossible to use structural features of the three-dimensional space included in the point cloud data implicitly, and only the redundancy at the binary level can be used. Binary data has a one-dimensional data structure, and the information quantity usable in compression processing is small in comparison with a data structure of higher dimensions. The general data compression techniques can be used for general purposes regardless of the data format and/or contents, but is inferior in respect of achievable compression efficiency in comparison with the data compression technique specialized for a specific data format.

Prior art (3) is a technique of dividing the space into three-dimensional meshes with the LiDAR device serving as the center, and presence/absence of point in the mesh is counted for all the meshes. In the prior art (3), the file size changes according to the granularity of the meshes. With the setting of the granularity to 10 centimeters or less that is practical for use of outdoor automatic driving of an automobile, the file size drastically increases in comparison with raw data. Although it is possible to use the prior art (3) and the prior art (1) together, it is not realistic to deal with a gigantic file of several hundred megabytes to several hundred gigabytes with a small-sized computer mounted on an automobile or a robot.

By contrast, in the technique according to the present embodiment, point cloud data from the LiDAR device 11 is arranged in a two-dimensional data structure, and thereby continuity of numerical values between pieces of data adjacent an a two-dimensional plane can be used for compression. This configuration enables achievement of high compression efficiency using an existing image compression technique, such as JPEG. This configuration enables both high compression rate and high expression accuracy. Specifically, the average error can be suppressed to 4.7 centimeters while the file size is reduced by 52%. In addition, as described later, when the compression rate is prioritized, the reduction rate of the file size reaches 87% at most.

In the prior art (1) or the prior art (2)+(1), a lossy compression method cannot be adopted, because binary data is dealt with. A lossless compression method dealing with data at a binary level causes no deterioration of contents accompanying compression of data, but it is impossible in principle to adjust the compression rate in accordance with the measurement accuracy having different requirement levels according to the use.

By contrast, the technique according to the present embodiment enables application of an image compression technique based on a lossy compression method, such as JPEG. The image compression technique based on a lossy compression method is capable of designating parameters of the compression rate, and capable of suppressing the file size at the sacrifice of expression accuracy of coordinate data.

FIG. 7 illustrates the file sizes and the average errors of coordinate values when the quality parameter of JPEG is changed, in the case where the point cloud data from VLP-16 described above is compressed by the technique according to the present embodiment. The quality parameter of JPEG can be designated with an integer value within a range from 1 to 100. When the maximum value 100 is designated as the quality parameter, the average error can be suppressed to a very small value of 0.5 cm. When the minimum value 1 is designated as the quality parameter, the file size can be reduced by 87%. As described above, the balance of the expression accuracy and the file size can be adjusted according to the use, and it is a characteristic that does not exist in conventional general compression techniques.

Other Embodiments

The present invention is not limited to the embodiment described above.

In an embodiment, the data conversion unit 122 may convert the distances included in the point cloud data into luminance values in gray scale (a brightness of color). For example, the data conversion unit 122 uses values obtained by multiplying the distances by a proper constant as the luminance values. Because the distance does not have any negative value, it causes no problem, while the image generation unit 123 is not capable of dealing with negative values. In this case, the image generation unit 123 generates a bitmap image by mapping the luminance values obtained by the data conversion unit 122 into a two-dimensional data structure in accordance with the emission directions included in the point cloud data. In the present embodiment, the emission direction is managed based on the position of the pixel. With reference to the example of FIG. 3 again, supposing that the rotation angle and the elevation/depression angle at the pixel (i, j) are $\theta_1$ and $\theta_2$, respectively, the angles can be expressed as "$\theta_1=15\times i$, $\theta_2=7.5-5\times j$" (i=0, 2, . . . , 23, j=0, 1, . . . , 3). In the point cloud data output from the data compression apparatus 12, each of the points is expressed with the polar coordinate system (specifically, a set of the direction and the distance).

An operation example of the data compression apparatus according to the present embodiment will now be described with reference to FIG. 8. Processing at Steps S801, S804, and S805 in FIG. 8 are the same as those in Steps S501, S504, and S505 illustrated in FIG. 5, and an explanation of the processing will be omitted.

Figure 8:
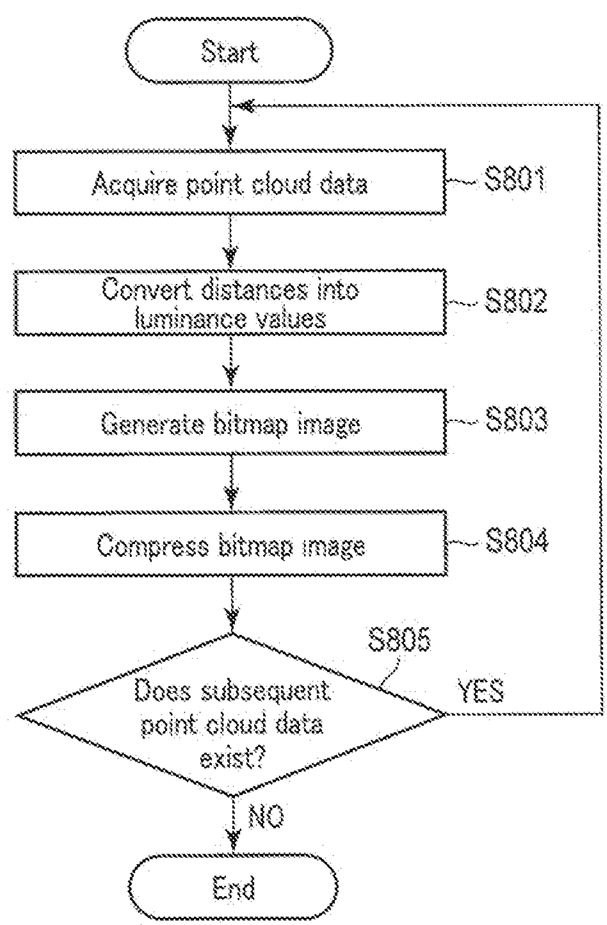
FIG. 8 is flowchart illustrating an operation example or the data compression apparatus according to an embodiment of the present invention.

At Step S802 in FIG. 8, the data conversion unit 122 converts distances included in the point cloud data acquired by the data acquisition unit 121 into luminance values. For example, the data conversion unit 122 converts the distances into respective luminance values by multiplying each of the distances by a constant.

At Step S803, the image generation unit 123 generates a bitmap image by mapping the luminance values into a two-dimensional data structure in accordance with the emission directions included in the point cloud data acquired by the data acquisition unit 121. For example, each of the emission directions is expressed with the rotation angle and the elevation/depression angle, and the image generation unit 123 generates a bitmap image by mapping the luminance values into a two-dimensional data structure in accordance with the values of the rotation angle and the values of the elevation/depression angle.

The configuration described above enables reflection of spatial continuity of the point cloud data on the luminance values. Thin configuration smooths change in luminance in the whole bitmap image, and enables effective suppression of deterioration of color caused by the image compression technique. Because the existing image compression techniques tend to reproduce the luminance more faithfully than the tone, and have an advantage that an error of the distance can be easily suppressed.

In an ordinary bitmap image, only 8 bits can be assigned to each of elements of RGB, and only numerical values of $2^8$=256 gradations can be expressed. For example, by dividing the color signal into units of 8 bits and embedding them in individual bitmap images, the technique according to the embodiment described above can be applied even when the color signal is expressed with 16-bit accuracy ($2^{16}$=65536 gradations) or 24-bit accuracy ($2^{24}$=16777216 gradations). For example, when the color signal (three-dimensional coordinate values) is expressed with 16 bits, the image generation unit 123 generates a first bitmap image based on the upper 8 bits of the color signal, and generates a second bitmap image based on the lower 8 bits of the color signal. In addition, when the luminance value is expressed with 16 bits, the image generation unit 123 generates a first bitmap image based on the upper 8 bits of the luminance value, and generates a second bitmap image based on the lower 8 bits of the luminance value.

The image compression unit 124 may apply different image compression techniques to the first bitmap image and the second bitmap image. For example, the image compression unit 124 performs lossless compression in the PNG method suitable for monotonous images for the first bitmap image with small color change and sensitive to noise, and performs lossy compression in the JPEG method suitable for complicated images and capable of adjusting the compression rate for the second bitmap image with large color change and resistant to noise. This configuration enables effective reduction of the file size while the expression accuracy of the coordinate data is maintained. The image compression unit 124 may apply the same image compression technique to the first bitmap image and the second bitmap image.

With respect to time-series data of the point cloud, in view of the fact that the LiDAR device 11 observes completely the same direction for each of rounds, a bitmap image generated from point cloud data for one round may be regarded as a frame, and point cloud data may be stored in the form of a movie file. Specifically, the image generation unit 123 may generate a plurality of bitmap images corresponding to respective pieces of point cloud data for a plurality of rounds, and generate a moving image including the bitmap images as frames. In this case, the image compression unit 124 applies an image compression technique for moving images to the moving image generated with the image generation unit 123. For example, an image compression technique using interframe prediction, such as MPEG, can be used as the image compression technique for moving images.

In the moving image generated as described above, pieces of data acquired by observing the same direction appear in the same position of the frames. This structure enables use of temporal continuity of the point cloud data for data compression. For this reason, by applying an image compression technique using interframe prediction, such as MPEG, it is possible to achieve highly efficient data compression utilizing temporal continuity of point cloud data.

Programs including the data compression program and the like may be provided to the data compression apparatus 12, in a state of being stored in a computer-readable storage medium. In this case, for example, the data compression apparatus 12 includes a drive which reads data from a storage medium, and acquires programs from the storage medium. Examples of the storage medium include a magnetic disk, an optical disk (such as a CD-ROM, a CD-R, a DVD-ROM, and a DVD-R), a magneto-optical disk (such as a MO), and a semiconductor memory. Alternatively, the programs may be stored in a server on a communication network, and the data compression apparatus 12 may download the programs from the server.

The present invention is not limited to the embodiment described above as it is, but can be carried out with the constituent elements modified within a range not departing from the gist thereof in the implementation phase. Various inventions can be made by proper combinations of the constituent elements disclosed in the embodiments described above. For example, some constituent elements may be removed from all the constituent elements disclosed in the embodiment. As another example, constituent elements of different embodiments may be used in proper combination.

Part or all of the embodiments described above may also be described as follows, but is not limited thereto.

In the first, aspect of the present invention, a data compression apparatus includes a data acquisition unit configured to acquire point cloud data including sets each including a direction and a distance from a ranging sensor, an image generation unit configured to generate a bitmap image based on directions and distances in the sets, and an image compression unit configured to apply a predetermined image compression technique to the bitmap image.

The first aspect of the present invention enables use of spatial continuity of the point cloud data for data compression. This configuration enables effective reduction of the file size of the point cloud data.

In the second aspect of the present invention, the data compression apparatus further includes a data conversion unit configured to convert the directions and the distances in the sets into color signals, and the image generation unit is configured to generate the bitmap image by mapping the color signals into a two-dimensional data structure in accordance with the directions.

The second aspect of the present invention enables reflection of spatial continuity of the point cloud data on the color signals. This configuration smooths color change in the whole bitmap image, and enables effective reduction of the file size by the image compression technique.

In the third aspect of the present invention, the data conversion unit is configured to convert the directions and the distances in the sets into the color signals by converting the direction and the distance in each of the sets into a three-dimensional coordinate value and regarding the three-dimensional coordinate value as an RGB value including three numerical values expressing a color.

According to the third aspect of the present invention, the position of each of the points is expressed with the three-dimensional orthogonal coordinate system. As a result, the point cloud data can be easily deal with in the subsequent processing.

In the fourth aspect of the present invention, the three-dimensional coordinate value include three coordinate values greater than or equal to 0.

According to the fourth aspect of the present invention, the three-dimensional coordinate value can be regarded as the color signal without any processing, and processing to generate a bitmap image is simplified.

In the fifth aspect of the present invention, the data compression apparatus further includes a data conversion unit configured to convert the distances into luminance values in a gray scale, and the data conversion unit is configured to generate the bitmap image by mapping the luminance values into a two-dimensional data structure in accordance with the directions.

The fifth aspect of the present invention enables reflection of spatial continuity of the point cloud data on the luminance value. This configuration smooths change of luminance in the whole bitmap image, and enables effective suppression of deterioration of data caused by the image compression technique.

In the sixth aspect of the present invention, the ranging sensor is a rotation-type ranging sensor, and the point cloud data is point cloud data obtained by the ranging sensor while the ranging sensor makes one rotation.

The sixth aspect of the present invention enables effective reduction of the file size of the point cloud data output from the rotation-type ranging sensor.

In the seventh aspect of the present invention, the predetermined image compression technique includes an image processing technique based on lossy compression.

The seventh aspect of the present invention enables more effective reduction of the file size and/or adjustment of the compression rate.

In the eighth aspect of the present invention, the image generation unit is configured to generate a first bitmap image based on upper bits of the color signals and generate a second bitmap image based on lower bite of the color signals, the predetermined image compression technique includes a first image compression technique and a second image compression technique different from the first image compression technique, and the image compression unit is configured to apply the first image compression technique to the first bitmap image and apply the second image compression technique to the second bitmap image.

The eighth aspect of the present invention enables effective reduction of the file size while the expression accuracy of the coordinates is maintained.

In the ninth aspect of the present invention, the data acquisition unit is configured to acquire a plurality of pieces of point cloud data, the image generation unit is configured to generate bitmap images corresponding to the pieces of point cloud data and generate a moving image including the bitmap images as frames, and the image compression unit is configured to apply on image compression technique using interframe prediction to the moving image.

The ninth aspect of the present invention enables use of temporal continuity of point cloud data for data compression. This configuration enables effective reduction of the file size.

In the tenth aspect of the present invention, a data compression method is performed by a computer, and includes seeps of acquiring point cloud data including sets each including a direction and a distance from a ranging sensor, generating a bitmap image based on directions and distances in the sets, and applying a predetermined image compression technique to the bitmap image.

The tenth aspect of the present invention produces the same effect as that of the data compression apparatus according to the first aspect.

In an eleventh aspect of the present invention, a program is a program to cause a computer to function as units included in the data compression apparatus according to any one of the first to the ninth aspects.

The eleventh aspect of the present invention produces the same effect as that of the data compression apparatus according to any one of the first to the ninth aspects.

REFERENCE SIGNS LIST

10 . . . Ranging apparatus
11 . . . LiDAR device
12 . . . Data compression apparatus
121 . . . Data acquisition unit
122 . . . Data conversion unit
123 . . . Image generation unit
1231 . . . Data arrangement unit
1232 . . . Image conversion unit
124 . . . Image compression unit
41 . . . CPU
42 . . . Program memory
43 . . . RAM
44 . . . Input/output interface
45 . . . Bug

The invention claimed is:

1. A data compression apparatus comprising: a processor configured to:
acquire point cloud data including sets each including a direction and a distance from a ranging sensor;
generate a bitmap image based on directions and distances in the sets; and
apply a predetermined image compression technique to the bitmap image,
convert the directions and the distances in the sets into color signals, and
generate the bitmap image by mapping the color signals into a two-dimensional data structure in accordance with the directions,
generate a first bitmap image based on upper bits of the color signals and generate a second bitmap image based on lower bits of the color signals,
wherein the predetermined image compression technique includes a first image compression technique and a second image compression technique different from the first image compression technique, and
apply the first image compression technique to the first bitmap image and apply the second image compression technique to the second bitmap image.

2. The data compression apparatus according to claim 1, wherein the processor is configured to convert the directions and the distances in the sets into the color signals by converting the direction and the distance in each of the sets into a three-dimensional coordinate value and regarding the three-dimensional coordinate value as an RGB value including three numerical values expressing a color.

3. The data compression apparatus according to claim 2, wherein the three-dimensional coordinate value include three coordinate values greater than or equal to 0.

4. The data compression apparatus according to claim 1, wherein the processor is configured to:
convert the distances into luminance values in a gray scale; and
generate the bitmap image by mapping the luminance values into a two-dimensional data structure in accordance with the directions.

5. The data compression apparatus according to claim 1, wherein
the ranging sensor is a rotation-type ranging sensor, and
the point cloud data is point cloud data obtained by the ranging sensor while the ranging sensor makes one rotation.

6. The data compression apparatus according to claim 1, wherein the predetermined image compression technique includes an image processing technique based on lossy compression.

7. The data compression apparatus according to claim 1, wherein the processor is configured to:
acquire a plurality of pieces of point cloud data;
generate bitmap images corresponding to the pieces of point cloud data and generate a moving image including the bitmap images as frames; and
apply an image compression technique using interframe prediction to the moving image.

8. A data compression method performed by a computer, the method comprising:
acquiring point cloud data including sets each including a direction and a distance from a ranging sensor;
generating a bitmap image based on directions and distances in the sets; and
applying a predetermined image compression technique to the bitmap image,
converting the directions and the distances in the sets into color signals, and
generating the bitmap image by mapping the color signals into a two-dimensional data structure in accordance with the directions,
generating a first bitmap image based on upper bits of the color signals and generating a second bitmap image based on lower bits of the color signals,
wherein the pre determined image compression technique includes a first image compression technique and a second image compression technique different from the first image compression technique, and applying the first image compression technique to the first bitmap image and applying the second image compression technique to the second bitmap image.

9. A non-transitory computer readable medium storing a computer program that, when executed by a computer, causes the computer to:

acquire point cloud data including sets each including a direction and a distance from a ranging sensor;

generate a bitmap image based on directions and distances in the sets; and apply a predetermined image compression technique to the bitmap image, convert the directions and the distances in the sets into color signals, and generate the bitmap image by mapping the color signals into a two-dimensional data structure in accordance with the directions, generate a first bitmap image based on upper bits of the color signals and generate a second bitmap image based on lower bits of the color signals, wherein the predetermined image compression technique includes a first image compression technique and a second image compression technique different from the first image compression technique, and apply the first image compression technique to the first bitmap image and apply the second image compression technique to the second bitmap image.

* * * * *